United States Patent
Yang et al.

(10) Patent No.: US 7,031,697 B2
(45) Date of Patent: Apr. 18, 2006

(54) CORRELATION OF CALL DATA FOR CALLING AND CALLED PARTIES IN WIRELESS TELECOMMUNICATION NETWORKS

(75) Inventors: ZhongJin Yang, Naperville, IL (US); Jie Yao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 237 days.

(21) Appl. No.: 10/624,015

(22) Filed: Jul. 21, 2003

(65) Prior Publication Data

US 2005/0020252 A1    Jan. 27, 2005

(51) Int. Cl.
*H04M 3/42*    (2006.01)

(52) U.S. Cl. .................. 455/414.1; 455/406; 455/415; 455/416; 455/426.1; 455/428; 455/445; 455/426.2

(58) Field of Classification Search ............. 455/414.1, 455/414.3, 414.4, 415, 416, 401, 418, 419, 455/426.1, 406, 445, 407, 428, 409, 426.2
See application file for complete search history.

(56) References Cited

U.S. PATENT DOCUMENTS

| | | | | |
|---|---|---|---|---|
| 5,768,352 A * | 6/1998 | Elliott et al. ............ | 379/112.01 |
| 5,822,401 A * | 10/1998 | Cave et al. ............... | 379/32.02 |
| 5,978,681 A * | 11/1999 | Bertacchi ..................... | 455/445 |
| 6,154,644 A * | 11/2000 | Murray ..................... | 455/414.1 |
| 6,577,718 B1 * | 6/2003 | Kalmanek et al. ..... | 379/114.22 |
| 6,606,377 B1 * | 8/2003 | Ruckart et al. ......... | 379/121.02 |
| 6,606,598 B1 * | 8/2003 | Holthouse et al. .......... | 704/275 |
| 6,611,498 B1 * | 8/2003 | Baker et al. .................. | 370/252 |
| 6,771,950 B1 * | 8/2004 | Shupe et al. ............. | 455/414.1 |
| 6,909,779 B1 * | 6/2005 | Rauba .................... | 379/202.01 |
| 2001/0037269 A1 * | 11/2001 | Marsh et al. .................. | 705/34 |
| 2001/0053706 A1 * | 12/2001 | Petrakos et al. ............ | 455/566 |
| 2002/0077128 A1 * | 6/2002 | Okun et al. .................. | 455/458 |
| 2002/0085696 A1 * | 7/2002 | Martin et al. ........... | 379/201.03 |
| 2003/0069030 A1 * | 4/2003 | Mukherjee ................... | 455/461 |
| 2003/0083040 A1 * | 5/2003 | Ruth et al. ................... | 455/405 |
| 2003/0187800 A1 * | 10/2003 | Moore et al. .................. | 705/52 |
| 2003/0211843 A1 * | 11/2003 | Song et al. .................. | 455/411 |
| 2004/0120494 A1 * | 6/2004 | Jiang et al. ............ | 379/210.01 |
| 2004/0151292 A1 * | 8/2004 | Larsen .................... | 379/114.2 |
| 2005/0020263 A1 * | 1/2005 | Sherman et al. ......... | 455/435.1 |
| 2005/0216382 A1 * | 9/2005 | Chambers et al. ............ | 705/34 |

* cited by examiner

*Primary Examiner*—Sonny Trinh
*Assistant Examiner*—Huy Phan

(57) ABSTRACT

Call data associated with one call is correlated from separate call records associated with the calling and called parties in which at least one of the parties is a wireless user. Statistical information is gathered based on whether one of the parties to the call subscribes to one call feature/service and the other party to the call subscribes to a predetermined call feature/service. This information is typically utilized by telecommunication service providers.

13 Claims, 2 Drawing Sheets

CORRELATION OF CALL DATA FOR CALLING AND CALLED PARTIES IN WIRELESS TELECOMMUNICATION NETWORKS

BACKGROUND

This invention generally relates to call detail records from which traffic measurements can be derived for a telecommunication network. The invention is more specifically directed to the correlation of calling party and called party information in which at least one of the calling and called parties are subscribers in a wireless telecommunications network.

Call detail records as currently implemented by a switch or an adjunct associated with the switch can be used to measure traffic patterns. These records consider a call origination and a call termination (delivery) as independent events for mobile station (MS) calls, i.e. calls involving a wireless subscriber. That is, the call detail record for an originating MS call and the corresponding call detail record for the terminating MS of the same call are not correlated. Such call detail records can be used to derive some information as to traffic conditions and for the usage of a feature by the party associated with the specific call record.

Many new features have been introduced to subscribers in wireless voice/data systems by various service providers. Some features may be supported by only a specific service provider while other features have been sufficiently standardized and are available from most service providers. Although the currently available call detail records permit some traffic and feature information to be determined, such records are not able to provide additional information that would be helpful to service providers in maintaining and enhancing services and features offered to wireless subscribers. For example, it would be helpful for a service provider to know, during a given time interval, the percentage of calls that are: MS to MS, MS to a wireline subscriber, originating and terminating within the service provider's network, originating within the service provider's network and terminating outside of it, originating outside of the service provider's network and terminating in it. Even for calls totally within the service provider's network, it would be helpful to know the number of MS to MS calls in which both the originating and terminating parties utilized a specific call feature in order to determine future services to offer and existing services to enhance. To derive such additional information, information about the originating party and terminating party of the same call must be correlated. Thus, there exists a need for an improved method for collecting call related data that permits correlation of the data collected for the originating party and the terminating party of the same call.

SUMMARY OF THE INVENTION

It is an object to present invention to provide a solution for this need.

In accordance with an embodiment of the present invention, call data associated with one call is correlated from separate call records associated with the calling and called parties in which at least one of the parties is a wireless user. Statistical information is gathered based on whether one of the parties to the call subscribes to one call feature and the other party to the call subscribes to a predetermined call feature. This information is typically utilized by telecommunication service providers. As used herein, a call "feature" refers to features available for subscription or used by telecommunication users, and includes services to which users can subscribe.

DETAIL DESCRIPTION

Figure 1:
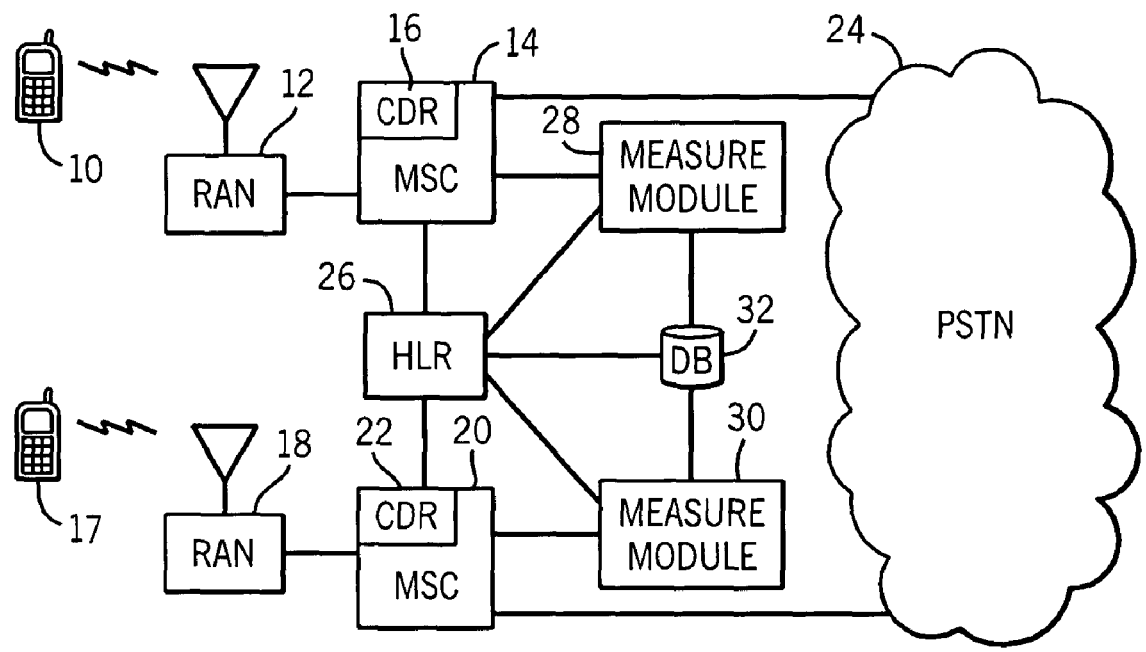
FIG. 1 is a block diagram of a telecommunication system suited for incorporating an embodiment of the present invention.

FIG. 1 illustrates a telecommunication network that supports wireless communications for subscribers. A wireless communication link between wireless device 10, such as a cellular telephone, and a radio access node (RAN) 12 is provided. A mobile switching center (MSC) 14 is connected to and supports RAN 12, and contains a call detail record (CDR) module 16 that collects and stores call related data associated with MSC 14. Similarly, a wireless device 17 is within the wireless coverage area of RAN 18 that is supported by MSC 20 which includes CDR module 22. Both MSCs 14 and 20 are coupled to the public switched telephone network (PSTN) 24 and to a home location register (HLR) 26 that contains records for registered mobile subscribers. A measurement module 28 is coupled to MSC 14, HLR 26, and database 32. Similarly, measurement module 30 is connected to MSC 20, HLR 26, and database 32. The measurement modules retrieve call related data and correlate data associated with the calling and terminating parties for a call. The correlated data is stored database 32.

Figure 2:
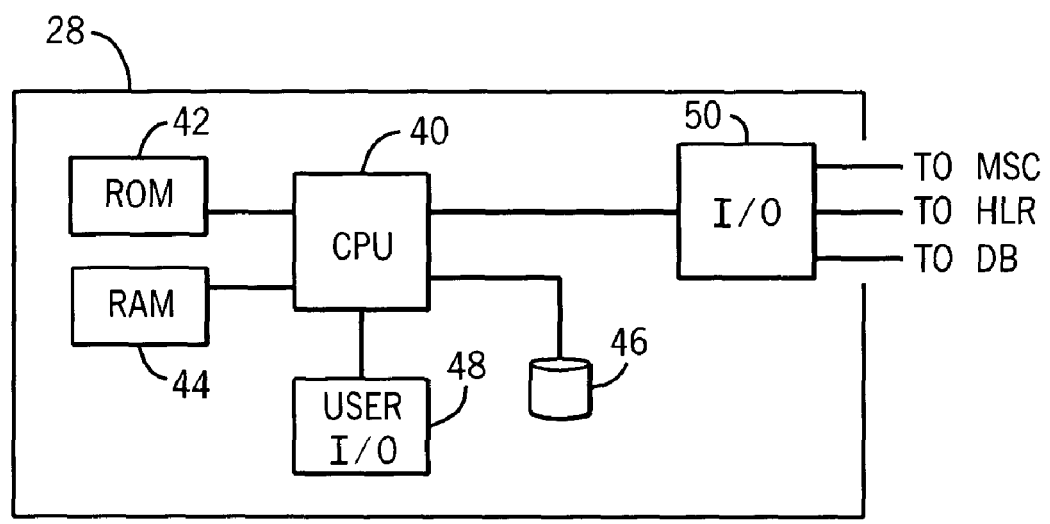
FIG. 2 is a block diagram of a measurement module as shown in FIG. 1.

FIG. 2 illustrates an exemplary embodiment of measurement module 28. A central processing unit (CPU) 40 operates under the control of stored program instructions and is supported by read-only memory (ROM) 42, random access memory (RAM) 44, and nonvolatile memory storage device 46 such as a hard disk. A user input/output (I/0) module 48 permits the CPU 40 to receive inputs from a user such as from a keyboard and/or pointing device, and provide outputs to the user such as on the screen of a display. An input/output module 50 is coupled to CPU 40 and provides an interface to permit communications between the CPU and external connected devices including MSC 14, HLR 26, and database 32. This permits the CPU to transmit queries seeking information stored in the external devices, receive messages responding to the queries, and transmit information to the external devices.

In the illustrative embodiment the measure modules 28 and 30 implement the correlation of calling party data and called party data. In cellular systems in the United States, wireless subscribers are commonly charged for airtime regardless of whether the subscriber is the called party or calling party. Therefore, separate call detail records will be generated by the originating and terminating wireless switches for the respective originating wireless subscriber and terminating wireless subscriber. The measure modules retrieve and correlate call data from call data records for the same call for both the called and calling parties so that features and subscribed to services associated with both parties to the call can be correlated. The correlated call record data permits the wireless service provider to better manage the allocation of infrastructure equipment, determine calling patterns and preferences, and identify new service and/or feature offerings based on usage statistics mined from the correlated call record data.

Some types of information can be discerned from the correlated call record data that could not be discerned from uncorrelated call record data. For example, with correlated call record data a service provider can determine whether wireless users that subscribe to the call waiting feature are more likely to call or be called by other subscribers that also subscribe to the call waiting feature (or to some other predetermined feature as specified by the service provider). A service provider could also use correlated call record data to determine if subscribers that utilize voicemail features are more likely to make and receive calls from subscribers that also utilize voicemail features. Information that is obtained from correlated call record data can be used to identify and enhance services found to be most valuable to subscribers, and to target a set of identified subscribers with special service/feature offers based on statistical usage of correlated services/features.

Figure 3:
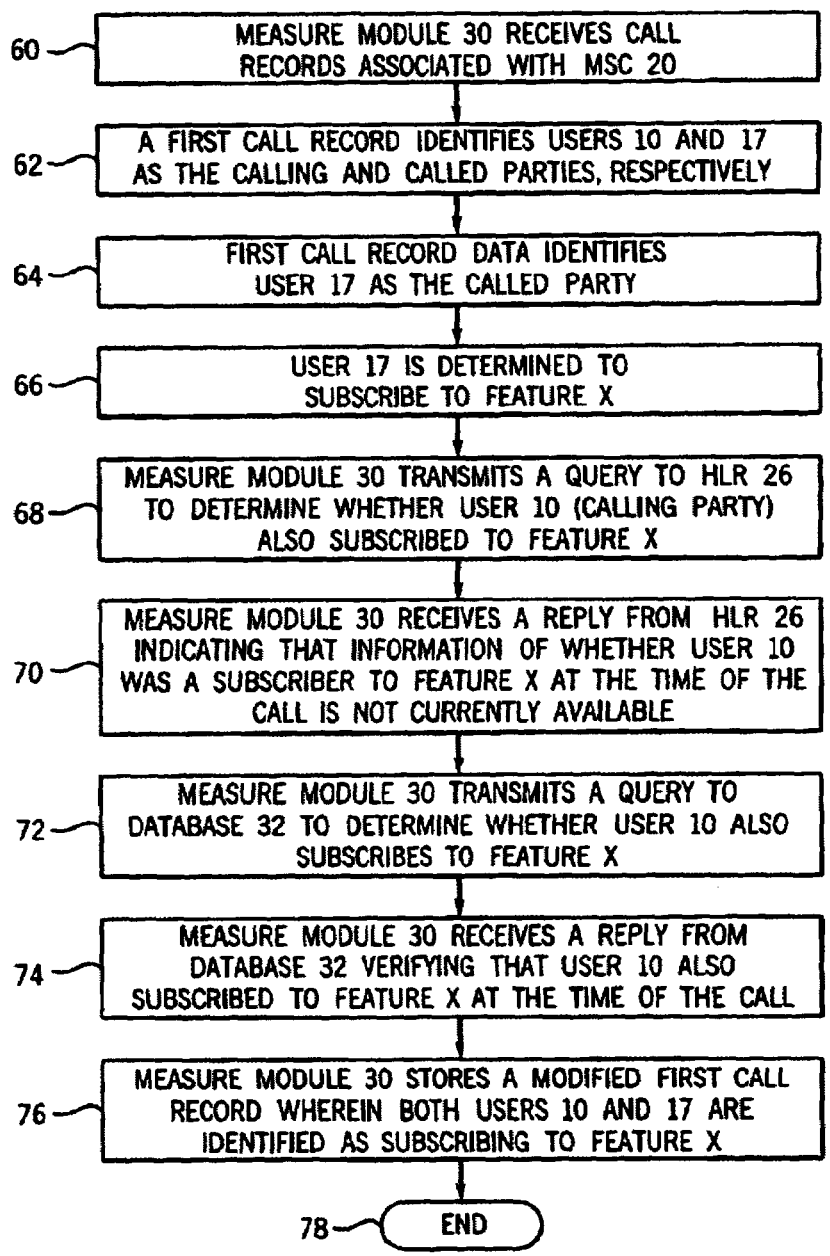
FIG. 3 is a flow diagram of exemplary steps in accordance with the present invention.

FIG. 3 is a flow diagram of an exemplary method in accordance with the present invention for determining and storing correlated call record data. In step 60 measure module 30 retrieves call records associated with MSC 20. The call records for calls associated with MSC 20 are collected on a call by call basis by CDR 22. The measure module 30 can automatically request and receive the call records collected by CDR 22 on a periodic basis, or can await a manual command to retrieve the call records from CDR 22. The measure module then begins the task of correlation of services/features for both parties to each call. In step 62 measure module 30 processes a first call record and identifies users 10 and 17 as the calling and call parties, respectively.

In this example the service provider is interested in determining the percentage of calls in which both the called and calling parties are subscribers of feature X, where feature X can be any feature available to users. In step 64 the first call record identifies user 17 (the called party) as the user directly supported by MSC 20. In step 66 the user 17 is determined to subscribe to feature X. This determination can be made by measure module 30 based on information about the subscribed to features of user 17 stored in the MSC 20, or if not available directly from the MSC 20, this information can be obtained from HLR 26. In step 68 the measure module 30 transmits a query to HLR 26 to determine whether user 10 (the calling party) also subscribes to feature X. This information will not be available from MSC 20 since user 10 is not directly supported by MSC 20. The identity of user 10, i.e. the directory telephone number of user 10, as the calling party is known from the first call record. The query contains the mobile directory number of user 10, identification of the feature of interest for correlation, i.e. feature X, and preferably includes the date and time of the subject call.

In step 70 the measure module 30 receives a reply message from the HLR 26 indicating that the information as to whether user 10 was a subscriber to feature X at the time of the call is not currently available. This information may not be available from HLR 26 where user 10 is a visitor to this network and HLR 26 is not user 10's HLR, and where HLR 26 is not the supporting home location register for user 10 due to the use of multiple HLRs in the service provider's network. Based on the unavailability of the sought information from the HLR, in step 72 measure module 30 transmits a query to database 32 to determine whether user 10 subscribed to feature X at the time of the subject call. In step 74 measure module 30 receives a reply message from database 32 verifying that user 10 also subscribed to feature X at the time of the call. The reply message contains information identifying the query and/or associated call record, and data relating to the feature of interest. For example, the mobile directory number of user 10 could be included in the reply message to identify the corresponding query to which the reply message is addressed. The value of a flag corresponding to the subject feature could be returned in the reply message as data relating to the feature of interest. The measure module 30 would contain a predetermined table in which the states of features are defined by corresponding flag values. In the illustrative example, it was determined by measure module 30 based on the reply message from database 32 that user 10 subscribed to feature X at the time of the subject call. In step 76 measure module 30 stores a modified first call record in which both users 10 and 17 are identified as subscribing to feature X. The modified call records are preferably stored in database 32 for later statistical processing by the measure modules. Alternatively, the measure modules can determine the desired statistic on a record by record basis and maintain a running count of the total number of records processed versus the number of records scanned that satisfied the specified correlation. The process terminates at END 78.

A wireless service provider can obtain information throughout the service provider's network by performing correlation processing of call records associated with each mobile switching center. In the illustrative network as shown in FIG. 1, measure module 28 provides similar call record correlation processing for call records collected by CDR 16 of MSC 14. Thus, if a service provider's network consisted only of MSCs 14 and 20, correlation processing by measurement modules 28 and 30 would populate database 32 with information about the service/feature for which correlation was sought. Of course, correlation can be obtained for a variety of services and features to enable the service provider to obtain statistical information useful in enhancing services for subscribers and growing revenues.

In addition to processing correlated call records, the measure modules can also provided statistical processing of the correlated call records in order to provide statistical information about calls and calling patterns made over the service provider's network. A cumulative count can be kept of the number of calls where both parties subscribed to the respective scanned for subscription features. This count can be contrasted with either the total number of calls or the number of calls wherein only one of the users subscribed to the scanned for subscription feature. For example, statistical information concerning calls made or received by subscribers of the X feature could determine that 65% of calls, in which at least one of the users is a subscriber to the X feature, were made between parties that both subscribe to the X feature.

Various changes and substitutions can be made to the illustrative embodiment. Depending upon the capabilities of existing network elements, the measure modules could be incorporated into a single measure module, or could be incorporated into existing network elements with sufficient capacity, such as being incorporated into the call data record modules of the mobile switching centers. Alternatively the measurement module function could be incorporated into the home location register node. The correlated call records could be stored in other than a separate, independent database if another database in the network with sufficient capacity is available. In order to obtain correlation data for services and features associated with calls between wireless subscribers and wireline subscribers, the measure modules may also transmit queries to and receive reply messages from call data record nodes in the public switched telephone network associated with switches that support the wireline subscribers. These changes and substitutions are merely illustrative of the changes and substitutions that those skilled in the art may elect to make.

Although an embodiment of the present invention has been described and shown in the drawings, the scope of the invention is defined by the claims to follow.

We claim:

1. An automated method for correlating call data associated with one call from separate call detail records associated with the calling and called parties in which at least one of the parties is a wireless user in a wireless telecommunication network comprising the steps of:
    accessing a first call detail record associated with one of the calling and called parties for a first previously completed call;
    ascertaining the identity of the other of the calling and called parties from the first call detail record;
    determining if the one party subscribes to a first feature based on information contained in the first call detail record;
    accessing a second call detail record associated with the other of the calling and called parties for the first call where the second call detail record is stored independent of the storage of the first call detail record;
    determining if the other party subscribes to a predetermined feature based on information contained in the second call detail record;
    determining if a predetermined correlation exists for the first call based on whether the one party subscribes to the first feature and the other party subscribes to the predetermined feature based on information contained in the first and second call detail records.

2. The automated method according to claim 1 wherein the first call detail record is stored at a first location associated with a first switch that supports the one of the calling and called parties, and the second call detail record is stored at a second location associated with a second switch that supports the other of the calling and called parties.

3. The automated method according to claim 1 wherein the step of accessing the second call detail record comprises transmitting a query from a correlation measurement node to another node in which the second call detail record is stored.

4. The automated method according to claim 3 wherein the step of determining if the other party subscribes to the predetermined feature comprises receiving a reply message at the correlation measurement node in response to said query of the another node, the reply message containing data indicating whether the other party subscribes to the predetermined feature.

5. The automated method according to claim 3 wherein the step of determining if the other party subscribes to the predetermined feature comprises receiving a reply message at the correlation measurement node in response to said query of the another node, the reply message indicating that information is not currently available as to whether the other party subscribed to the predetermined feature, the step of accessing the second call detail record further comprising transmitting another query from the correlation measurement node to a database that stores information on features subscribed to by wireless users, receiving another reply message at the correlation measurement node in response to the another query, the another reply message containing data indicating whether the other party subscribes to the predetermined feature.

6. The automated method according to claim 1 wherein the step of determining if a predetermined correlation exists comprises determining if both of the following conditions are true: the first party subscribed to the first feature at the time of the first call; and the second party subscribed to the predetermined feature at the time of the first call.

7. The automated method according to claim 1 further comprising the step of modifying the first call detail record to indicate that the other party subscribed to the predetermined feature if it is determined that the predetermined correlation exists for the first call based on whether the one party subscribes to the first feature and the other party subscribes to the predetermined feature.

8. The automated method according to claim 7 wherein the step of modifying the first call detail record to indicate that the other party subscribed to the predetermined feature is implemented where the first feature and the predetermined feature are the same feature.

9. An automated method for obtaining statistical information based on calls in a wireless telecommunication network comprising the steps of:
    determining for one previously completed call between a first wireless user and a second user if the first wireless user subscribes to a first predetermined call feature based on information contained in a first call detail record associated with said one call where said first call detail record represents one of call origination and call termination;
    identifying a second call detail record associated with said one call based on information contained in a first call detail record, said second call detail record being stored independent of storage of the first call detail record and representing the other of call origination and call termination;
    determining for the one call if the second user subscribes to a second predetermined call feature based on information contained in the second call detail record;
    repeating the above steps for other calls;
    maintaining a count of the calls in which both of the above determining steps are true and comparing said count with the total number of calls to generate said statistical information.

10. The automated method according to claim 9 wherein the step of determining for the one call if the second user subscribes to the second predetermined call feature comprises transmitting a query from a correlation measurement node to another node in which the second call detail record is stored.

11. The automated method according to claim 10 wherein the step of determining for the one call if the second user subscribes to the second predetermined call feature comprises receiving a reply message at the correlation measurement node in response to said query of the another node, the reply message containing data indicating whether the second party subscribes to the second predetermined feature.

12. The automated method according to claim 9 further comprising the step of modifying the first call detail record to indicate that the second user subscribed to the second predetermined feature if it is determined that a predetermined correlation exists for the first call based on whether the first user subscribes to the first feature and the second user subscribes to the predetermined feature.

13. The automated method according to claim 12 wherein the step of modifying the first call detail record to indicate that the second user subscribed to the second predetermined feature is implemented where the first and second predetermined features are the same feature.

* * * * *